(12) United States Patent
Miki

(10) Patent No.: US 6,228,313 B1
(45) Date of Patent: May 8, 2001

(54) PROCESS FOR PRODUCING INCOMPATIBLE POLYMER-CONTAINING POLYESTER FILM

(75) Inventor: Takatoshi Miki, Sakata-gun (JP)

(73) Assignee: Mitsubishi Polyester Film Corporation, Tokyo (JP)

( * ) Notice: Subject to any disclaimer, the term of this patent is extended or adjusted under 35 U.S.C. 154(b) by 0 days.

(21) Appl. No.: 09/128,567

(22) Filed: Aug. 4, 1998

(30) Foreign Application Priority Data

Aug. 4, 1997 (JP) .................................................. 9-208805

(51) Int. Cl.⁷ ............................. B29C 47/40; B29C 47/76
(52) U.S. Cl. ..................... 264/466; 264/101; 264/210.1; 264/210.7; 264/211.23
(58) Field of Search ..................................... 264/466, 920, 264/DIG. 65, 211.23, 101, 210.1, 210.7

(56) References Cited

U.S. PATENT DOCUMENTS 4,771,108  9/1988  Mackenzie .
5,833,905 * 11/1998  Miki ............................... 264/211.21

FOREIGN PATENT DOCUMENTS 0 203 233  12/1986  (EP) .

OTHER PUBLICATIONS

Abstract of Japan 6–91,635 (Apr. 5, 1994).

Abstract of Japan 9–235,398 (Sep. 9, 1997).

* cited by examiner

*Primary Examiner*—Leo B. Tentoni
(74) *Attorney, Agent, or Firm*—David G. Conlin; Lisa Swiszcz Hazzard; Dike, Bronstein, Roberts & Cushman, LLP

(57) ABSTRACT

The present invention relates to a process for producing a polyester film containing a incompatible polymer, comprising:

using a vented twin-screw extruder having a material feed port and vents in the cylinder, and melt-extruding a substantially undried polyester together with a polymer incompatible with said polyester, which melt-extruding is conducted under the condition that the content of said incompatible polymer is not less than 1 wt % based on the total output based on unit time (kg/hr), and the total output Q, extruder screw speed N (rpm) and cylinder bore D (mm) satisfy the following formula $$2.6 \times 10^{-6} \times D^{2.8} \leq Q/N \leq 15.8 \times 10^{-6} \times D^{2.8}.$$

5 Claims, No Drawings

PROCESS FOR PRODUCING INCOMPATIBLE POLYMER-CONTAINING POLYESTER FILM

BACKGROUND OF THE INVENTION

The present invention relates to a process for producing a incompatible polymer-containing polyester film. More particularly, it relates to a process for producing a incompatible polymer-containing polyester film, in which a substantially undried polyester is melt extruded with a incompatible polymer from a vented twin-screw extruder under the specific conditions, so that the incompatible polymer can be uniformly dispersed in the polyester while sufficiently maintaining inherent qualities of the polyester and the incompatible polymer. The process of the present invention is also energy-saving and capable of reducing the production cost.

Since polyester films have excellent properties, those have been widely used in recent years for electronic white boards or magnetic cards such as credit cards, prepaid cards, for example, telephone cards, JR (Japan Railway) cards, pachinko (pinball) cards, etc., in many fields of commercial activities such as finance, communication, amusement, transportation, etc., and their range of utilization is expected to expand in the future.

Recently, the aromatic polyester-based white films containing a white pigment such as titanium oxide or barium sulfate, or those having fine closed cells provided for reducing weight and bettering cushioning characteristics have come to be used for various types of printing material and image receiving sheet.

Various methods have been proposed for forming the fine closed cells. For example, there are mentioned methods in which a gas or a gasifiable material is incorporated in the film and let it expand as described in Japanese Patent Application Laid-Open (KOKAI) No. 50-38765, Japanese Patent Publication (KOKOKU) No. 57-46456 and Japanese Patent Application Laid-Open (KOKAI) No. 57-34931; a material which is chemically decomposed to generate a gas is added and the film is expanded as described in Japanese Patent Application Laid-Open (KOKAI) No. 52-43871 and Japanese Patent Publication (KOKOKU) No. 58-50625; a liquid is impregnated in the film after molding and a material soluble in the solvent is extracted as described in Japanese Patent Publication (KOKOKU) No. 52-27666.

These methods, however, have problems in film productivity and thickness uniformity, so that as means for forming the cells in the film during or after the stretching step, usually a method comprising blending a thermoplastic resin incompatible with polyesters, such as proposed in Japanese Patent Application Laid-Open (KOKAI) No. 63-168441, is used.

The polymers incompatible with polyesters, include polyolefin polymers such as polyethylene and polypropylene, and polystyrene polymers which include polystyrene homopolymers and random copolymers composed of repeating units of mainly styrene and other monomers.

Polyacrylate-based, polyacryl-based and silicone-based polymers are also usable as incompatible polymer.

Various problems are generated in the extrusion method in which a polyester and a incompatible polymer are plasticized and melt extruded into a film by using a same extruder.

Since the thermoplastic resins incompatible with polyesters are different in melting point from the polyesters, plasticization time also differs from polyesters to the thermoplastic resins incompatible with polyesters (for instance, the melting point of polypropylene is about 160° C., so that it is plasticized earlier than the polyester in the extruder), which causes such problems as improper charge of material and variation of pressure at the delivery end of the extruder.

Particularly when such improper extrusion takes place in a single-screw extruder, the plasticized resin adheres to the surface of the extruder screw, thereby blocking transfer of the material and its plasticization. Once such problems arise, it is necessary to dismount the extruder screw by stopping the production line for removing the resin adhering to the screw, so that the productivity is badly deteriorated.

In the case of a twin-screw extruder, the problem of imperfect plasticization also occurs because the sites of plasticization of the two polymers differ due to the difference in melting point. This may cause agglomeration of the unmelted polyester particles in the molten polymer extruded into a film. In a twin-screw extruder having vacuum vents, removal of moisture may become insufficient because of improper plasticization of the polyester in vacuo, resulting in an excess decrease of degree of polymerization of the polyester.

It is known that when a polyester is melt-extruded in the presence of moisture, the degree of polymerization lowers because of hydrolysis of the polyester. In order to prevent the decrease of the degree of polymerization thereof, methods such as a method of guiding the polyester to the extruder after reducing its water content by drying, after the crystallization treatment are taken, but the problem still exists that the polymerization degree may lower due to the action of moisture present in the incompatible polymer blended in the polyester in the extruder, or the amount of the incompatible polymer to be blended can not be increased because of the presence of moisture mentioned above.

The said method of guiding the polyester to the extruder after reducing water content of the polymer incompatible with the polyester necessitates equipment for drying the incompatible polymer, which requires extra equipment investment. Also, when the polymer is subjected to the drying treatment by heating, there may take place coloration due to heat deterioration of the said polymer or a decrease of polymerization degree, and a reduction of drying temperature is required for avoiding such a problem. Low melting point is also detrimental to efficient drying of the polymer.

As a result of the present inventor's earnest studies to solve the above problems, it has been found that these problems can be overcome by specifying the incompatible polymer content, total output per unit time, extruder screw speed and cylinder bore to satisfy the specific conditions by using a specific extruder. The present invention has been attained on the basis of the above finding.

SUMMARY OF THE INVENTION

It is an object of the present invention to provide a process for producing incompatible polymer-containing polyester films, which can sufficiently maintain the inherent qualities of the polyester and the polymer incompatible therewith, which process is energy-saving and is excellent in the reduction of production cost.

To attain the above aim, in an aspect of the present invention, there is provided a process for producing a polyester film containing a incompatible polymer, comprising:

using a vented twin-screw extruder having a material feed port and vents in the cylinder, and melt-extruding a substantially undried polyester together with a polymer incompatible with said polyester, under the condition that the content of said incompatible polymer is not less than 1 wt % based on the total output based on unit time (kg/hr), and the total output Q, extruder screw speed N (rpm) and cylinder bore D (mm) satisfy the following formula.

$$2.6 \times 10^{-6} \times D^{2.8} \leq Q/N \leq 15.8 \times 10^{-6} \times D^{2.8}$$

DETAILED DESCRIPTION OF THE INVENTION

The present invention is described in detail below.

The polyesters used in the present invention are those comprising an aromatic dicarboxylic acid moiety and a glycol moiety, preferably the ones in which not less than 80% of the repeating units comprising ethylene terephthalate units, ethylene-2,6-naphthalate units or 1,4-cyclohexylenedimethylene terephthalate units. These polyesters may have a copolymerized third component.

As the aromatic dicarboxylic acid moiety, there may be used, beside terephthalic acid and 2,6-naphthalenedicarboxylic acid, one or more isophthalic acid, phthalic acid, adipic acid, sebacic Acid, 4,4'-diphenyldicarboxylic acid, oxycarboxylic acid (such as p-oxyethoxybenzoic acid) and the like. As the glycol moiety, there may be used, beside ethylene glycol and 1,4-cyclohexane-dimethanol, one or more of diethylene glycol, triethylene glycol, propylene glycol, butanediol, neopentyl glycol and the like. In either case, when the term "polyester" is used in the present invention, it refers to a polyester in which not less than 80% of the repeating units comprising ethyleneterephthalate units or ethylene-2,6-naphthalene units.

The polymers incompatible with polyesters (such polymers being hereinafter referred to simply as "incompatible polymers") usable in the process of the present invention include polyolefin-based polymers. The kind of such polymers usable in the present invention is not limited, but it is preferred to use those polymers which have a higher modulus of elasticity than the polyesters in the temperature range above the glass transition point of the polyesters in the amorphous state, because these polymers are capable of forming a plurality of fine air cells in the film. Polyethylene, polypropylene and the like can be mentioned as preferred examples of the polyolefin polymers. The melt flow index of these polyolefin polymers is usually in the range from 0.2 to 120 g/10 min, preferably from 0.5 to 50 g/10 min.

The polystyrene-based polymers also usable as incompatible polymer in the present invention include polystyrene homopolymers obtained by polymerizing styrene monomers, and random, block or graft copolymers constituting repeating units of principally styrene and other monomers. Specifically, such polymers include, for example, generally used amorphous polystyrenes, impact-resistant polystyrenes, acrylonitrile-styrene based copolymer, acrylonitrile-butadiene-styrene resins and the like.

Examples of the incompatible polymers other than those mentioned above include poly-3-methylbutene-1, poly-4-methylpentene-1, polyvinyl-t-butane, 1,4-trans-poly-2-dimethylbutadiene, polyvinylcyclohexane, polyvinyl-t-butyl ether, cellulose acetate, cellulose tripropionate, polychlorotrifluoroethylene and the like.

Acrylic-based polymers, polyacrylic-based polymers and silicone-based polymers are also usable as the incompatible polymers in the process of the present invention.

In the present invention, the amount of the incompatible polymer supplied for melt extrusion is not less than 1 wt %, preferably not less than 3 wt % based on the total output. The amount of the incompatible polymer may be optionally selected provided that it is not less than 1 wt %, as far as the object of the present invention is attainable. The upper limit of the amount of the incompatible polymer is usually 40%.

In the present invention, a polyester and a incompatible polymer are supplied to a twin-screw extruder from a same feed port. The important feature of the present invention is to perform the stabilized melt extrusion even in case where the polyester and the incompatible polymer used are different in melting point, there is no need of providing the feed port of the incompatible polymer separately from the feed port of the polyester for the purpose of coordinating plasticization of the incompatible polymer with that of the polyester.

In the present invention, a twin-screw extruder having at least one bent which is reduced in pressure is used.

The bore (cylinder bore) D (mm) of the twin-screw extruder used in the present invention is not specified. The length L (mm) of the twin-screw extruder used in the present invention is preferably 20 to 50 D (D being the cylinder bore of the twin-screw extruder), preferably 25 to 45 D. When L is more than 50 D, the residence time in the extruder is prolonged, which may cause heat deterioration of the polyester and incompatible polymer. On the other hand, when L is less than 20 D, the polyester tends to fail to plasticize sufficiently, thereby making it unable to perform stable melt-extrusion.

The substantially undried polyester and incompatible polymer contain, in most cases, moisture of an amount below the equilibrium moisture content, so that it is important to remove the moisture immediately after the polyester begins to melt for preventing decrease of the intrinsic viscosity IV of the polyester due to hydrolysis in the extruder.

For this purpose, the vacuum vents are preferably provided at a location which can remove moisture immediately after plasticization of the polyester, the first vent being provided at the location which is usually less than 30 D from the material feed port. The number of such vacuum vents provided is not definite, but preferably two or more of such vents are provided.

Release of moisture is attained by vacuum venting. Moisture is diffused from the surface of the molten polyester under vacuum. In order to maximize moisture removing efficiency, the degree of vacuum at the vent is preferably adjusted to be not more than 40 hpa, more preferably not more than 30 hpa, even more preferably not more than 20 hpa.

By the present inventors' investigation, the renewal of polymer surface, namely, increase of surface area of the moisture-containing molten polyester under vacuum venting in the extruder is important. By the present inventors' further researches for elevating the moisture venting effect to allow more stabilized plasticization of the incompatible polymers with different melting points while enabling efficient removal of moisture obtained in such polymers, it was found that it is essential to control the extruder screw speed so as to remain in an appropriate range in conformity to the bore and output of the extruder.

Generally, the inside of a twin-screw extruder is in a so-called "famine" state where it is not filled up with the material excepting local packed-up sections. This makes it possible to select the screw speed from a relatively wide range for the fixed output.

When the screw speed is increased with a fixed output, the surfaces of the polyester and incompatible polymer present on the screen surface are forcibly renewed, moisture removal efficiency from the molten polyester and molten incompatible polymer is enhanced. Namely, the higher the screw speed is made with the output fixed, the better becomes the moisture removal efficiency.

Further studies on the relation between screw speed and moisture removal efficiency, however, it was found that there takes place lowering of the IV retention percentage, after it has once been improved or retained, when the screw speed is still increased with a fixed output.

In an attempt to investigate the cause of the above phenomenon, the present inventor measured the resin temperature of the molten polyester discharged from the extruder and found that the resin temperature rises with the increase of screw speed, and the occurrence of the decrease of IV retention percentage from a certain region is attributable to the acceleration of heat deterioration by rise of resin temperature.

It was further found that stabilized plasticization of the polyester and incompatible polymers with different melting points can be accomplished by optimizing the screw speed so that plasticization of the said polyester and incompatible polymers is performed under the shearing action created by the axial force of the screw.

Thus, in the present invention, the screw speed N (rpm) satisfies the following formula in relation to the cylinder bore D (mm) and total output Q per unit time(kg/hr):

$$2.6 \times 10^{-6} \times D^{2.8} \leq Q/N \leq 15.8 \times 10^{-6} \times D^{2.8}$$

In the region where Q/N exceeds the upper limit of the above formula ($15.8 \times 10^{-6} \times D^{2.8}$), the screw speed is too low for the output, and the degree of renewal of the molten resin surface in vacuo lowers, so that it may be difficult to perform preferred moisture removal. This not only may deteriorate the IV retention percentage but also lowers the plasticization activity derived from the axial force of the screw, resulting in incomplete plasticization of the polyester. In case where the melting point of the incompatible polymer is lower than that of the polyester, plasticization of the incompatible polymer is performed preferentially over the polyester, resulting in unfavorable of plasticization of the polyester, and in certain cases, the polyester may even fail to melt in the plasticization section of the extruder where normally the polyester is supposed to be plasticized, making it unable to perform preferred moist removal from the polyester through the first vent and also causing to such problems as blocking of the first vent by the polyester and release of the unmelted polyester from the extrusion end.

In the region where Q/N is less than the lower limit of the above formula ($2.6 \times 10^{-6} \times D^{2.8}$), the heat generation by shearing of the screw is too excess due to too high screw speed for the output, thereby causing heat deterioration or decomposition of the incompatible polymer so that it may be difficult to make it unable to maintain its quality.

The lower limit of Q/N is preferably $2.7 \times 10^{-6} \times D^{2.8}$, more preferably $3.0 \times 10^{-6} \times D^{2.8}$.

By controlling the extruder operating conditions as defined by the above formula, it has become possible to perform plasticization of the polyester and that of the incompatible polymer simultaneously and, as a result thereof, uniformly disperse the incompatible polymer in the polyester.

The polyester and incompatible polymer to be melt extruded may be substantially undried, with their water content in the composition when extruded being around 10 wt %, preferably less than 10 wt %. If the water content exceeds around 10 wt %, since the moisture vaporized at the solid transport portion in the extruder returns to the material feed port, it may be difficult to transfer the material.

The polyester and incompatible polymer may be the dry ones if it is possible to dry them without affecting their quality. Especially in the case of polyester, even if a polyester dried to a water content of less than 50 ppm is used, the melt extruded polymer is not affected in properties and can use for the purpose.

The screws of the twin-screw extruder used in the present invention may be arranged either to revolve in the same direction or to revolve in the opposite directions, but it is preferable to revolve in the same direction because of stable revolution of the screws.

The decrease of intrinsic viscosity of the polyester after extruded from the extruder in the present invention is preferably not more than 10%, more preferably not more than 9%, even more preferably not more than 8%. If the decrease of intrinsic viscosity exceeds 10%, in case where the film is stretched biaxially, break of the film is apt to take place frequently in the film stretching step to deteriorate continuity of film production, resulting in reduced productivity. Also, if the obtained film has low molecular weight, it may be unable to use practically because of lack of strength.

In the present invention, other polymer(s) may be added as a third component to the said polyester and incompatible polymer in an amount not exceeding 20 wt % based on the weight of the film as far as the object of the present invention is not hindered. It is also possible to add inorganic and/or organic particles and/or a pigment. For instance, a white pigment may be added to enhance whiteness of the produced film. Such particles and pigment may be added either independently or in the form of a masterbatch prepared by blending them in the polyester and/or incompatible polymer. Beside such particles and pigment, it is further possible to add various types of known additives such as color pigment, fluorescent whitener, stabilizer, colorant, defoaming agent, foam stabilizer, antistatic agent, antioxidant and the like.

According to the present invention, it is possible to easily produce the incompatible polymer-containing polyester films with reduced energy for the operation and at low cost while maintaining inherent qualities of the polyester and the polymer incompatible therewith which are used in the process, and thus the present invention has a great industry value.

EXAMPLES

The present invention is described in further detail below by showing the examples thereof, but the present invention is not limited to these examples but can be embodied in other forms as well without departing from the scope and spirit of the invention. In the following Examples and Comparative Examples, all percents (%) are by weight unless otherwise noted.

(1) Intrinsic Viscosity [η] of Polyester (dl/g)

100 ml of a 50/50 (by weight) phenol/tetrachloroethane mixed solvent was added to 1 g of a polyester from which the polymers incompatible therewith and the additive particles have been separated, and the viscosity of this solution was measured at 30° C.

(2) Moisture Content

The moisture content in the polyester was measured by a moisture content micrometer CA-06 mfd. by Mitsubishi Chemical Corporation.

(3) Color Tone

Color tone was measured as "b value" according to the method of JIS Z-8722 using a color analyzer TC-1800MKII mfd. by Tokyo Denshoku KK.

(4) Melt Flow Index (MFI) (g/10 min)

Measured according to JIS K-6758-1981. The higher the measured value of MFI is, the lower is the melt viscosity of the polymer.

(5) Extrusion Properties

The following three items were evaluated as extrusion properties.

① IV Retention

IV retention was rated excellent (○) when decrease of IV of the polyester was not more than 10% and impractical (×) when decrease of IV exceeded 10%.

② Color Tone

Color tone was rated excellent (○) when the b value as not greater than 5.0 and impractical (×) whet the b value exceeded 5.

③ Extrusion Stability

Extrusion stability was defined as excellent (○) when there took place no blockage of the vents and extrusion could be carried out stably and impractical (×) when the occurrence of either of the following phenomena (a) or (b) was observed to take place within 30 seconds after start of extrusion:

(a) Blockage of the first vent occurred.

(b) Unmelted material was seen at the end of the extruder.

Example 1

87% of a substantially undried polyester ($\eta$=0.650 (dL/g); moisture content=0.2%) and 13% of crystalline polypropylene homopolymer chips (MFI=10) were melt extruded into a film by a vented twin-screw extruder (L/D=31.5, L being extruder length and D being extruder bore; both screws revolving in the same direction; first vent position=3.5 D from the material feed port) and rapidly cooled and solidified on a 30° C. rotating cooling drum using electrostatic pinning method to obtain an amorphous film.

The total output in the above operation was 200 kg/hr, and the screw speed was 300 rpm.

Examples 2–5

The same procedure as defined in Example 1 was conducted except for a change of total output and screw speed to obtain an amorphous polyester film.

Example 6

The 1.0 mm thick amorphous film obtained in Example 1 was stretched 3.1 times in the machine direction at 85° C. and 3.3 times in the transverse direction at 115° C., and then heat-treated at 240° C. for 5 seconds to obtain a biaxially stretched film. The film thickness was 100 μm. Continuity in the biaxial stretching operation was excellent, and a polyester film with a density of 1.0 (g/cc) could be produced in stable.

Comparative Examples 1–3

Melt extrusion was conducted in the same way as defined in Example 1 except for a change of extrusion rate and screw speed. In Comparative Examples 1 and 2, the inside of the screws was blocked with resin and the melt extrusion could not be conducted.

The obtained results are shown collectively in Table 1.

TABLE 1

|  | Example 1 | Example 2 | Example 3 | Example 4 | Example 5 | Comp. Example 1 | Comp. Example 2 | Comp. Example 3 |
|---|---|---|---|---|---|---|---|---|
| Output (kg/hr) | 200 | 200 | 200 | 200 | 270 | 200 | 300 | 100 |
| Screw speed (rpm) | 250 | 300 | 340 | 350 | 405 | 105 | 130 | 350 |
| Q/N | 0.80 | 0.67 | 0.59 | 0.57 | 0.67 | 1.90 | 2.31 | 0.29 |
| IV | 0.628 | 0.620 | 0.617 | 0.615 | 0.619 | — | — | 0.570 |
| Extrusion properties |  |  |  |  |  |  |  |  |
| IV | ○ | ○ | ○ | ○ | ○ | — | — | x |
| Color tone | ○ | ○ | ○ | ○ | ○ | — | — | x |
| Stability | ○ | ○ | ○ | ○ | ○ | x | x | Δ |
| Comprehensive evaluation | ○ | ○ | ○ | ○ | ○ | x | x | x |

What is claimed is:

1. A process for producing a polyester film containing a incompatible polymer, comprising:

using a vented twin-screw extruder having a material feed port and vents in the cylinder, and melt-extruding a substantially undried polyester together with a polymer incompatible with said polyester to form a polyester film, under the condition that the content of said incompatible polymer is not less than 1 wt % based on the total output based on unit time (kg/hr), and the total output Q, extruder screw speed N (rpm) and cylinder bore D (mm) satisfy the following formula:

$$2.6 \times 10^{-6} \times D^{2.8} \leq Q/N \leq 15.8 \times 10^{-6} \times D^{2.8}.$$

2. The process according to claim 1, wherein the decrease of intrinsic viscosity of the polyester after melt-extruding into a film is not more than 10%.

3. The process according to claim 1, wherein after melt-extruding, the extrudate is rapidly cooled and solidified on a rotating cooling drum using electrostatic pinning method, and then stretched at least in one axial direction.

4. The process according to claim 1, wherein moisture is removed from the undried polyester with the vent section of the twin-screw extruder maintained at a degree of vacuum of not more than 40 hpa.

5. The process according to claim 1, wherein the moisture content of the undried polyester is not more than 10 wt %.

* * * * *